UNITED STATES PATENT OFFICE.

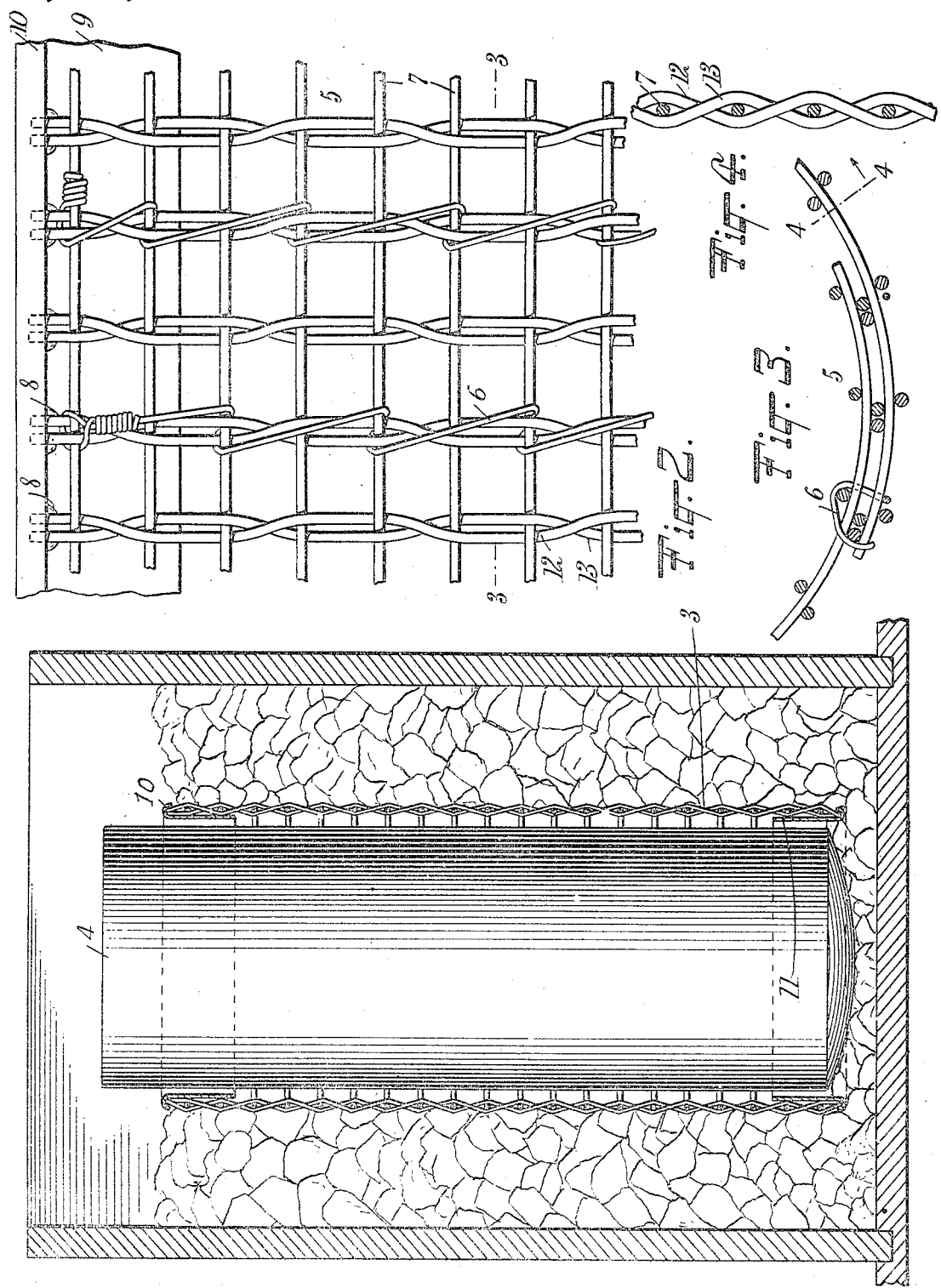

CARL A. KULENKAMPFF, OF NEW YORK, N. Y.

WIRE-MESH FABRIC.

1,055,764.

Specification of Letters Patent.

Patented Mar. 11, 1913.

Application filed February 16, 1912. Serial No. 677,905.

*To all whom it may concern:*

Be it known that I, CARL A. KULEN-KAMPFF, a citizen of the United States, and a resident of the city of New York, borough of Brooklyn, county of Kings, and State of New York, have invented a new and Improved Wire-Mesh Fabric, of which the following is a full, clear, and exact description.

This invention relates to improvements in wire mesh fabric, and has for an object to provide a structure in which the horizontal and vertical wires will be so locked together as to prevent any vertical movement of the horizontal wires.

A further object of the invention is to provide a wire mesh structure in which the vertical wires are woven back and forth and crossed at certain intervals for holding the horizontal wires properly spaced apart and against being moved or displaced vertically when pressure is brought to bear thereon.

In carrying out the objects of the invention, a wire mesh of a particular structure is provided, in which the horizontal wires or rings cannot be forced downward by reason of the fact that vertical wires are arranged in pairs and are woven back and forth. The arrangement of the vertical wires in this manner is adapted to lock the horizontal wires so that when the wire mesh is formed into various articles, as for instance ice cream can jackets, the horizontal wires cannot be beaten down or moved vertically.

A practical embodiment of the invention is represented in the accompanying drawings forming a part of this specification, in which similar characters of reference indicate corresponding parts in all the views.

Figure 1 is a longitudinal vertical section through an ice cream can holder and jacket formed of wire mesh embodying the invention; Fig. 2 is a fragmentary side view of a piece of wire mesh embodying the invention; Fig. 3 is a horizontal section through the overlapping ends of wire mesh on the line 3—3 of Fig. 2 embodying features of the invention, a tying wire being shown in connection therewith. Fig. 4 is a section through Fig. 3 approximately on the line 4—4.

Referring to the accompanying drawings by numerals, a wire mesh is shown in which the numeral 5 indicates the mesh as a whole, which is composed or made up of any desired number of horizontal wires 7, and a plurality of spaced pairs of vertical wires 12 and 13 which are woven back and forth as more clearly shown in Figs. 2 and 4, whereby the horizontal wires 7 cannot be forced downward when pressure is brought to bear thereon. The vertical wires 12 are made to extend over and under each of the consecutive horizontal wires 7, while the wire 13 extends similarly under and over the same horizontal wires. When wire 13 is under one of the horizontal wires, wire 12 is over the same wire, that is, the two wires are alternately over and under the wire 7. The pairs of wires 12 and 13 cross each other at intervals, between every two consecutive horizontal wires when the wire mesh is seen in face elevation. In forming this mesh the horizontal wires and the vertical wires are arranged in such relationship to each other as to provide substantially square openings so that the horizontal wires are supported at comparatively close intervals by the vertical wires and thus cause the horizontal wires to more strongly resist bending or any form of distortion. This form of wire mesh may be used on any article, but it is desirable especially for use as a guard for ice cream cans in order to prevent the ice from entering into the space provided for the can. In forming the wire mesh, the same may be dipped in a galvanizing solution, or any other desired similar solution.

After the wire mesh has been constructed as described, the same may be formed into various constructions, as for instance a guard 3 as disclosed in Fig. 1, holding the ice from the space designed to be occupied by the can 4. When the mesh is formed into a guard as mentioned, the same is overlapped preferably as shown in Fig. 3, and tied together by suitable fastening wires 6 lapped over each alternate wire 7 and extending diagonally over certain of the vertical wires 12 and 13. The top of the mesh 5 is preferably soldered at 8 to a protecting band or collar 9 having an overhanging flange 10. The bottom of the mesh 5 is also secured in a similar manner to a collar 11 so that the upper and lower edges of the guard will be braced so as to hold the more or less flexible mesh properly in place. This mesh is especially adapted for the making of guards for ice cream cans as the same will resist the packing or beating of the ice which is necessary and the respective horizontal wires 7 will be positively supported in their original position.

Having thus described my invention, I claim as new and desire to secure by Letters Patent:—

1. A wire mesh fabric, comprising a body portion formed with a plurality of horizontal wires, and a plurality of pairs of vertical wires, each of said wires of each of said vertical pairs extending consecutively over and under successive horizontal wires, said wires of each of said vertical pairs being at the opposite sides of each of said horizontal wires, and a twist formed in each of said pairs of vertical wires at intervals between every two consecutive wires.

2. A wire mesh fabric, comprising a body portion formed with a plurality of horizontal wires and a plurality of pairs of vertical wires, each of said wires of said vertical pairs extending successively over and under successive horizontal wires, said wires of each of said vertical pairs being at the opposite sides of each of said horizontal wires, and each of said wires of each of said pair of vertical wires crossing each other at intervals between every two consecutive horizontal wires when the wire mesh fabric is seen in face elevation.

In testimony whereof I have signed my name to this specification in the presence of two subscribing witnesses.

CARL A. KULENKAMPFF.

Witnesses:
A. L. KITCHIN,
JOHN P. DAVIS.